US012338990B2

(12) United States Patent
Wong et al.

(10) Patent No.: US 12,338,990 B2
(45) Date of Patent: Jun. 24, 2025

(54) STEAM GENERATOR

(71) Applicant: Otter Controls Limited, Fairfield (GB)

(72) Inventors: Kwok Hung Wong, Hong Kong (CN); Alex Reinier Nijhoff, Groningen (NL); Andrew Hunt, Bowdon (GB)

(73) Assignee: Otter Controls Limited, Fairfield (GB)

( * ) Notice: Subject to any disclaimer, the term of this patent is extended or adjusted under 35 U.S.C. 154(b) by 482 days.

(21) Appl. No.: 17/600,034

(22) PCT Filed: Apr. 2, 2020

(86) PCT No.: PCT/EP2020/059418
§ 371 (c)(1),
(2) Date: Sep. 29, 2021

(87) PCT Pub. No.: WO2020/201433
PCT Pub. Date: Oct. 8, 2020

(65) Prior Publication Data

US 2022/0186924 A1 Jun. 16, 2022

(30) Foreign Application Priority Data

Apr. 2, 2019 (GB) ..................................... 1904623

(51) Int. Cl.
*F22B 27/00* (2006.01)
*D06F 75/10* (2006.01)
(Continued)

(52) U.S. Cl.
CPC .............. *F22B 1/285* (2013.01); *D06F 75/10* (2013.01); *F22B 37/30* (2013.01); *H05B 3/20* (2013.01);
(Continued)

(58) Field of Classification Search
CPC .... F22B 1/26; F22B 27/00; F24H 1/10; F24H 1/26; A47J 27/004; A47J 27/06; A47J 27/21
See application file for complete search history.

(56) References Cited

U.S. PATENT DOCUMENTS 7,326,891 B2 * 2/2008 Sung ....................... F22B 1/281
392/405
9,664,378 B2 * 5/2017 Vempati .................. F22B 1/285
(Continued)

FOREIGN PATENT DOCUMENTS

CN 202247455 U 5/2012
CN 106287633 A 1/2017
(Continued)

OTHER PUBLICATIONS

International Search Report and Written Opinion of the International Searching Authority mailed Sep. 8, 2020, Issued in connection with International Application No. PCT/EP2020/059418 (15 pages).
(Continued)

*Primary Examiner* — Gregory A Wilson
(74) *Attorney, Agent, or Firm* — McCarter & English, LLP

(57) ABSTRACT

A steam generator including a heating chamber for heating water to generate steam, with a sidewall of the heating chamber being a heating element. The steam generator may be installed in an appliance, and may be removably installed in the appliance.

21 Claims, 5 Drawing Sheets

(51) Int. Cl.
*F22B 1/28* (2006.01)
*F22B 37/30* (2006.01)
*H05B 3/20* (2006.01)

(52) U.S. Cl.
CPC .. *H05B 2203/013* (2013.01); *H05B 2203/021* (2013.01)

(56) References Cited

U.S. PATENT DOCUMENTS

| | | | | |
|---|---|---|---|---|
| 10,743,701 | B2 * | 8/2020 | Schoenemann | F16T 1/00 |
| 2006/0278630 | A1 | 12/2006 | Sung et al. | |
| 2010/0083845 | A1 * | 4/2010 | Block | F22B 1/284 392/394 |
| 2018/0028013 | A1 | 2/2018 | Schoenemann et al. | |

FOREIGN PATENT DOCUMENTS

| | | | | | |
|---|---|---|---|---|---|
| CN | 208832427 | U | | 5/2019 | |
| CN | 112030476 | B | * | 8/2024 | D06F 39/40 |
| DE | 20 2012/003416 | U1 | | 4/2012 | |
| DE | 10 2011/084408 | A1 | | 2/2013 | |
| EP | 2290155 | A1 | | 3/2011 | |
| EP | 2325381 | A1 | | 5/2011 | |
| EP | 3225139 | A1 | * | 10/2017 | A47J 27/04 |
| GB | 2466219 | A | | 6/2010 | |
| JP | 2009/074737 | A | | 4/2009 | |
| KR | 20060128101 | A | * | 12/2006 | |
| WO | 90/13771 | A1 | | 11/1990 | |
| WO | WO-9013771 | A | * | 11/1990 | F22B 1/284 |
| WO | 2008/150172 | A1 | | 12/2008 | |
| WO | 2012/085602 | A1 | | 6/2012 | |
| WO | 2017/100571 | A1 | | 6/2017 | |

OTHER PUBLICATIONS

Combined Search and Examination Report dated Sep. 26, 2019, issued in connection with UK Patent Application No. GB1904623.4 (5 pages).
Search and Examination Report dated Jul. 16, 2020, issued in connection with UK Patent Application No. GB1904623.4 (4 pages).
Examination Report dated Jul. 28, 2021, issued in connection with UK Patent Application No. GB1904623.4 (2 pages).
EPO Communication dated Jan. 25, 2023, issued in connection with European App. No. 20716776.8, and enclosing Third-Party Observations submitted on Jan. 18, 2023 (4 pages).
Communication Under Rule 71(3) EPC—Intention to Grant dated Oct. 10, 2024, issued by the European Patent Office in connection with European Application No. 20716776.8 and including text intended for grant (32 pages).
Communication Pursuant to Rule 114(2) EPC—Third Party Observations dated Mar. 24, 2025, issued by the European Patent Office in connection with European Application No. 20716776.8 (4 pages).

* cited by examiner

Figure 2
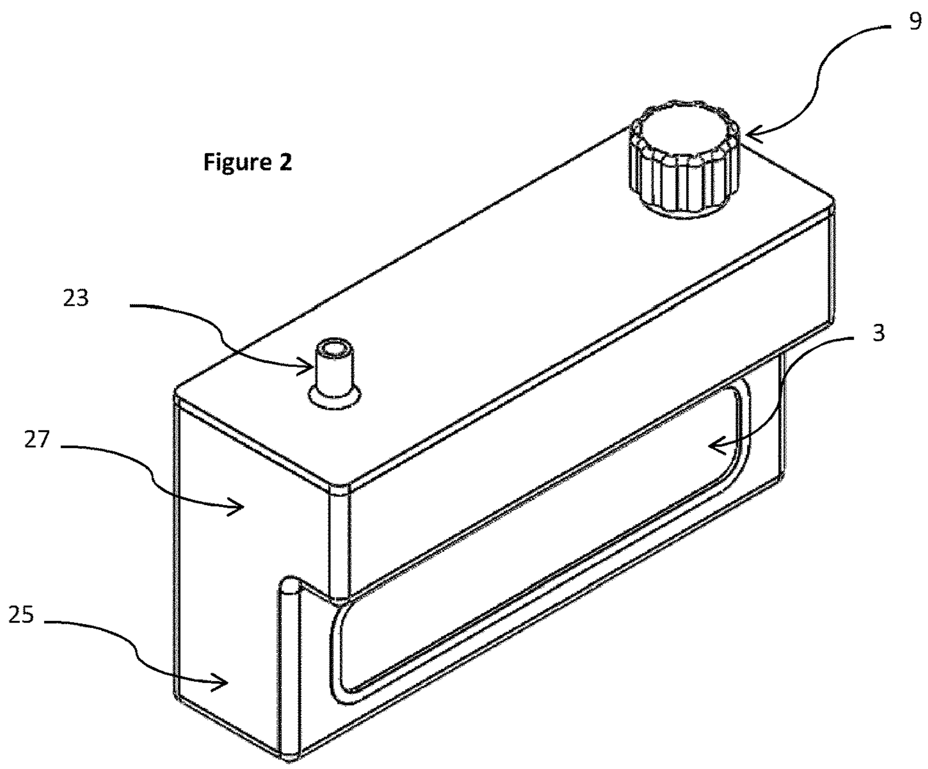
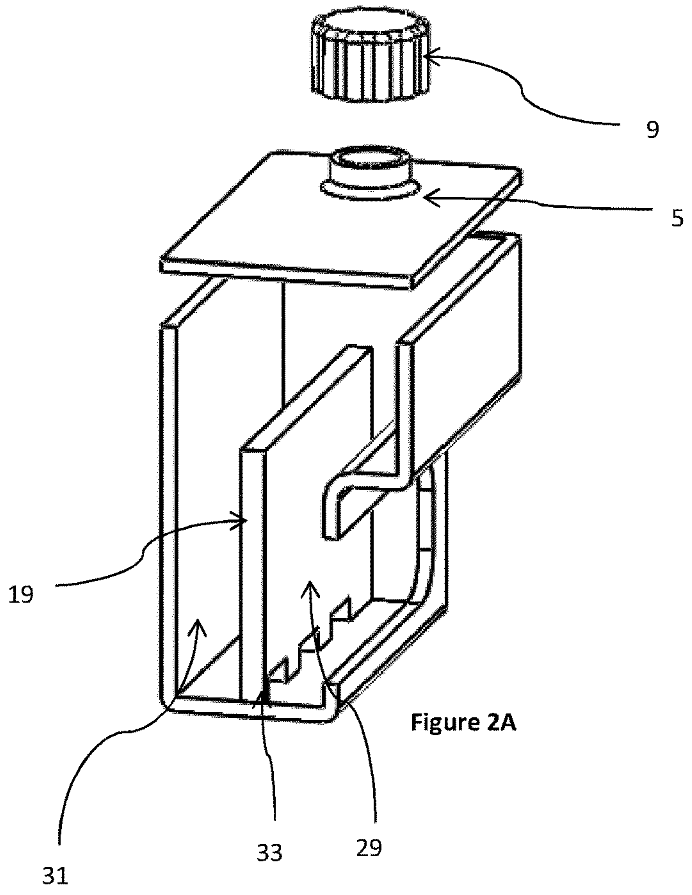
Figure 2A

Figure 4
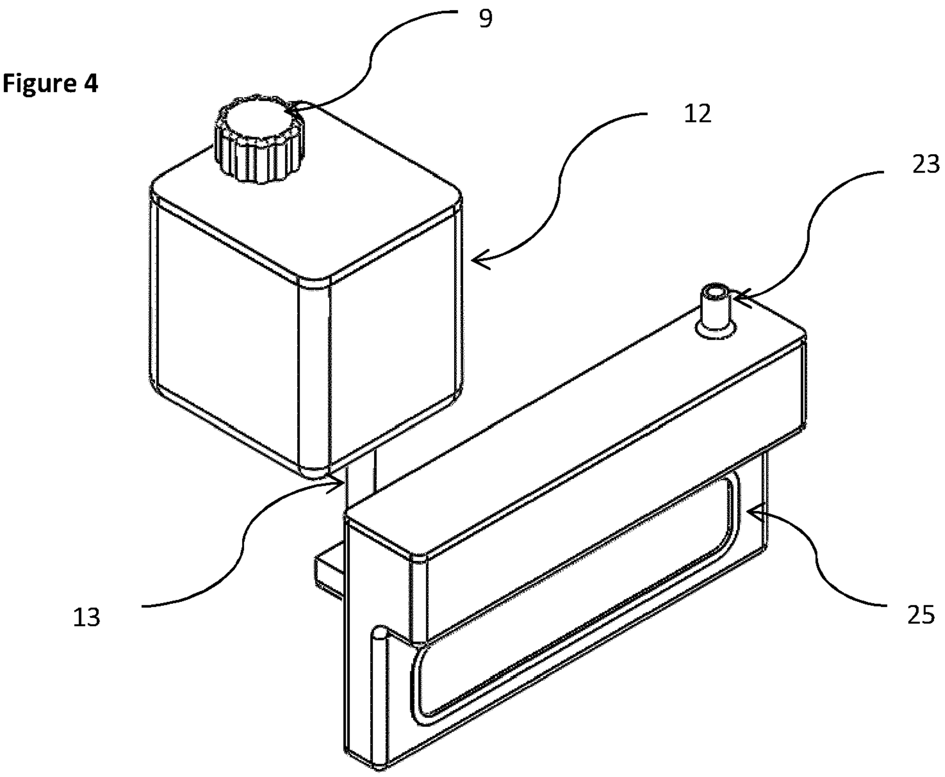
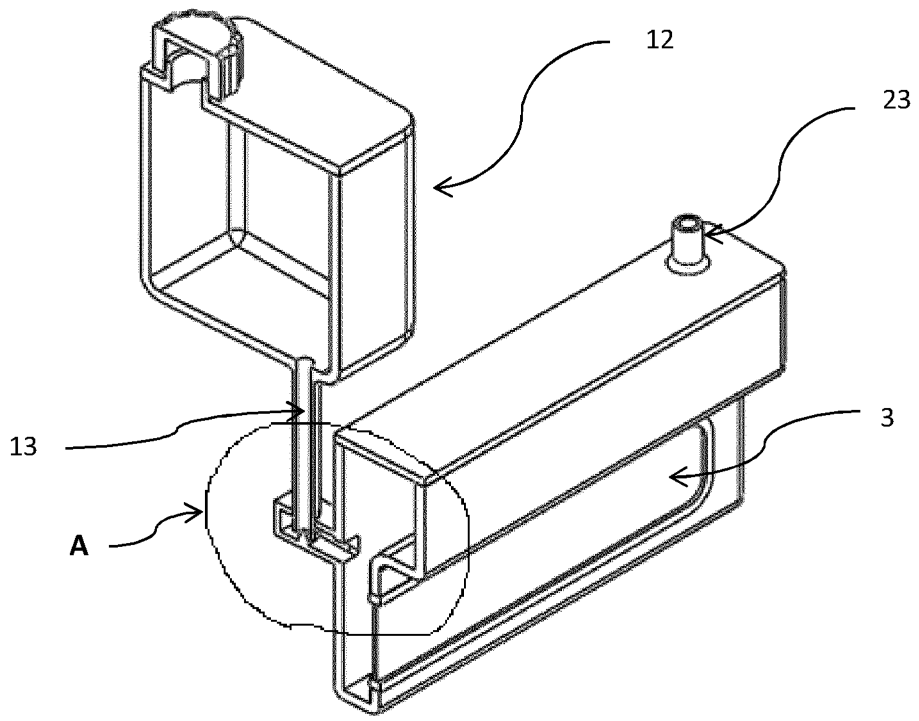
Figure 4A

Figure 4B
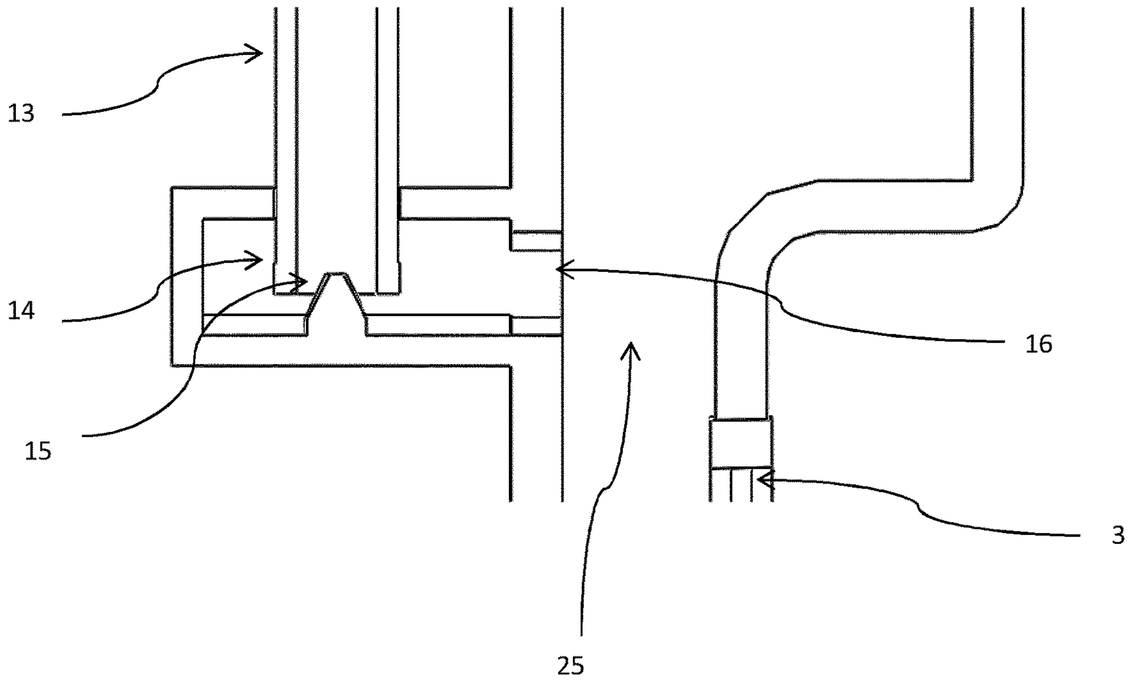
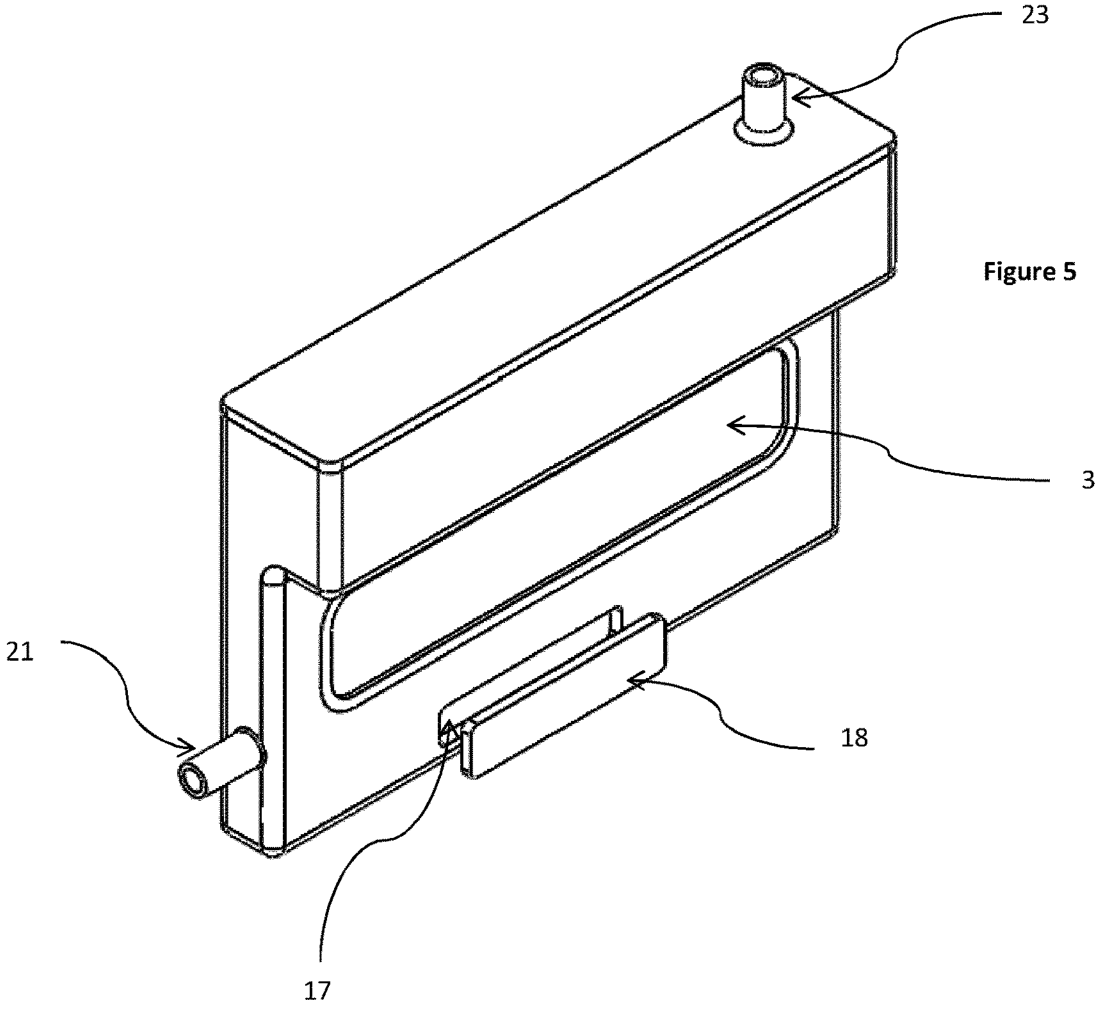
Figure 5

STEAM GENERATOR

RELATED APPLICATIONS

The present application is a U.S. National Phase Application under 35 U.S.C. § 371 of International Application No. PCT/EP2020/059418 filed on Apr. 2, 2020, which claims the benefit of United Kingdom (Great Britain) Patent Application No. 1904623.4 filed on Apr. 2, 2019, the entire disclosures of which are expressly incorporated by reference herein.

FIELD OF THE INVENTION

The present invention relates to a steam generator, and particularly to a steam generator for use in domestic applications.

BACKGROUND OF THE INVENTION

Steam is used in many different fields of application and for a wide range of purposes. For instance, in the domestic environment steam is used to assist in cleaning, practical DIY tasks, cooking and ironing. Accordingly, steam generators are found in many domestic appliances, such as clothes irons, steam cleaners, wallpaper strippers, and cooking ovens. However, in domestic applications in particular, there are a number of particularly important concerns for users.

One such concern is the overall size of an appliance, with small and compact appliances being highly desirable. Accordingly, space is at a premium for designers of such appliances, as they seek to make appliances as small as possible. In current steam appliances, the steam generator unit is a limiting feature which dictates the minimum possible size of the appliance. In particular, the steam generator unit has a large footprint within the appliance. For instance, domestic ironing appliances are often large and bulky, at least partly because of the arrangement of the water storage chamber and integrated heating element.

Another important concern for users is that appliances are quick and convenient to operate. For the designer, the appliance therefore needs to be ready to operate as soon as possible after being switched on. Hence the time taken for a steam generator to reach operating temperature is also of primary concern.

Users also desire long operating lifetimes and low maintenance. For steam generating appliances, a major contributor to degradation of the appliance is the buildup of deposits such as limescale. These deposits cause a large number of problems, including blocking up pipework, degrading the heating element and reducing the accuracy of temperature sensors. When deposits build up on the heating element, they create a thermally insulating barrier between the heating element and the water which increases the temperature of the heating element when heating the water and generating steam. Operating at a higher temperature causes damage to the heating element through increased exertion. All of these effects reduce the operating efficiency and functioning of the appliance during normal use, and decrease the overall operating lifetime.

Specific steam generators as known in the art take a number of forms. One of the simplest and earliest in the marketplace resembles an electric kettle and comprises a container with a tubular sheathed heating element fixed into the wall of a vessel. An example of such an arrangement is shown in WO 90/13771 A1. The heating appliance shown here is a standard kettle and includes thermal cut-out circuitry which disconnects the supply of electrical power to the heating element when the water level reaches a predetermined minimum level. However, the thermal cut-out circuitry will only operate when there is virtually no water left in the heating chamber, and at this stage the entire heating element is overheating. If the use of the thermal cut-out circuitry is frequently relied on, the operating lifetime of the heating element will be significantly reduced. Further, such repeated dry boiling will cause the formation of increased amounts of deposits such as limescale.

Developments in the heating elements and associated thermal cut-out circuitry resulted in the 'underfloor' heating element. An example of this is shown in the present Applicant's prior application WO 2012/085602 A1. In particular, FIGS. 53qa and 53qz show an aluminium sheathed tubular heating element brazed to an aluminium plate, which in turn is brazed to a stainless steel plate. A thermal cut-out 520 is shown attached to the aluminium plate. This combined heating element and thermal cut-out assembly forms the base of the appliance, with the stainless steel plate being exposed to the water for heating. A similar assembly is shown in the present Applicant's prior application GB 2466219 A, which shows a 'thick film' heating element forming the base of the kettle. Prior art steam generating apparatuses typically use these underfloor heating elements.

STATEMENT OF THE INVENTION

Aspects of the invention are defined by the accompanying claims.

According to a first aspect of the present invention, there is provided a steam generator which includes a heating chamber which is configured to hold water and to heat the water to a temperature sufficient to generate steam. The heating chamber has sidewalls, and a surface of one of the sidewalls forms the heating element for heating the water to generate steam.

The heating chamber may be divided into an upper and a lower portion, and the sidewall forming the heating element may be the surface of a sidewall of the lower portion. Thereby, the lower portion may be configured to both hold and heat the water. The upper portion may be configured to receive any steam generated by water being heated in the lower portion.

The upper portion may be wider than the lower portion. In particular, the upper portion may be wider in a direction perpendicular to the plane of the sidewall surface of the lower portion forming the heating element. The upper portion may include a baffle or mesh filter element, or a combination of the two, configured to prevent unwanted water droplets from passing through the upper portion with the steam. Hence the baffle or mesh filter element is configured to allow steam to pass through the upper portion, but to prevent water droplets from passing through the upper portion.

The lower portion may include a standing wall, which is at least partially heat insulating. This wall may be in a plane parallel to the heating element, and should be arranged to divide the lower portion into a first area for holding water adjacent to and in contact with the heating element, and a second area for holding water that is not in contact with the heating element. The wall includes holes or passages which allow water to flow between the first and second areas at a certain rate. When the heating element is heating the water, the water in the first area in contact with the heating element may heat faster than the water in the second area. As steam is generated in the first area, the cooler water from the second area may flow into the first area and thereby supplies the first area with water to be generated into steam.

The steam generator may include a reservoir. The reservoir may be located in use at a height substantially the same as the lower portion of the heating chamber, or substantially above the height of the lower portion of the heating chamber. The reservoir may serve to supply the lower portion with water, in particular whilst the water in the lower portion is being heated. The reservoir may be airtight, and may be in communication with the lower portion through a valve such that water is only supplied to the lower portion at certain times when the valve is open, or when the valve allows water to flow out and/or air to flow into the reservoir. The reservoir may be removable from the steam generator.

The heating chamber may have an outlet located near its base such that any fluid inside the heating chamber may be emptied out and removed from the heating chamber, and in particular so that any solid deposits such as limescale may also be removed from the heating chamber by the user.

The heating chamber may include a thermal sensor. The thermal sensor may be configured to detect temperatures of specific areas of the heating element, and may therefore be able to detect local overheating of areas of the heating element, and/or increases or decreases in temperatures of particular areas of the heating element. The thermal sensor may be configured to detect a temperature of the heating element at a particular location which may indicate that the level of water in the heating chamber is below a desired height, such as a minimum water height. The detection of temperatures by the thermal sensor may be used to automatically operate a pump to refill the heating chamber with water, for instance if a temperature is detected which indicates that the level of water is approaching or at the minimum desired water height in the heating chamber. There may be a plurality of thermal sensors, located at different heights of the heating element in use.

Other aspects and optional features of the invention are defined in the claims.

Various embodiments and aspects of the invention are described without limitation below, with reference to the figures.

BRIEF DESCRIPTION OF THE DRAWINGS

There now follows, by way of example only, a detailed description of preferred embodiments of the present invention, with reference to the figures identified below.

FIG. 2 shows a perspective view of a steam generator according to an embodiment of the present invention, and FIG. 2A shows a cross-sectional and exploded partial view of the same embodiment;

FIG. 4 shows a perspective view of a steam generator according to an embodiment of the present invention, and FIG. 4A shows a cross-sectional view of the same embodiment, with FIG. 4B showing detail A of FIG. 4A;

FIG. 5 shows a perspective view of a steam generator according to an embodiment of the present invention.

DETAILED DESCRIPTION OF THE EMBODIMENTS

Figure 1:
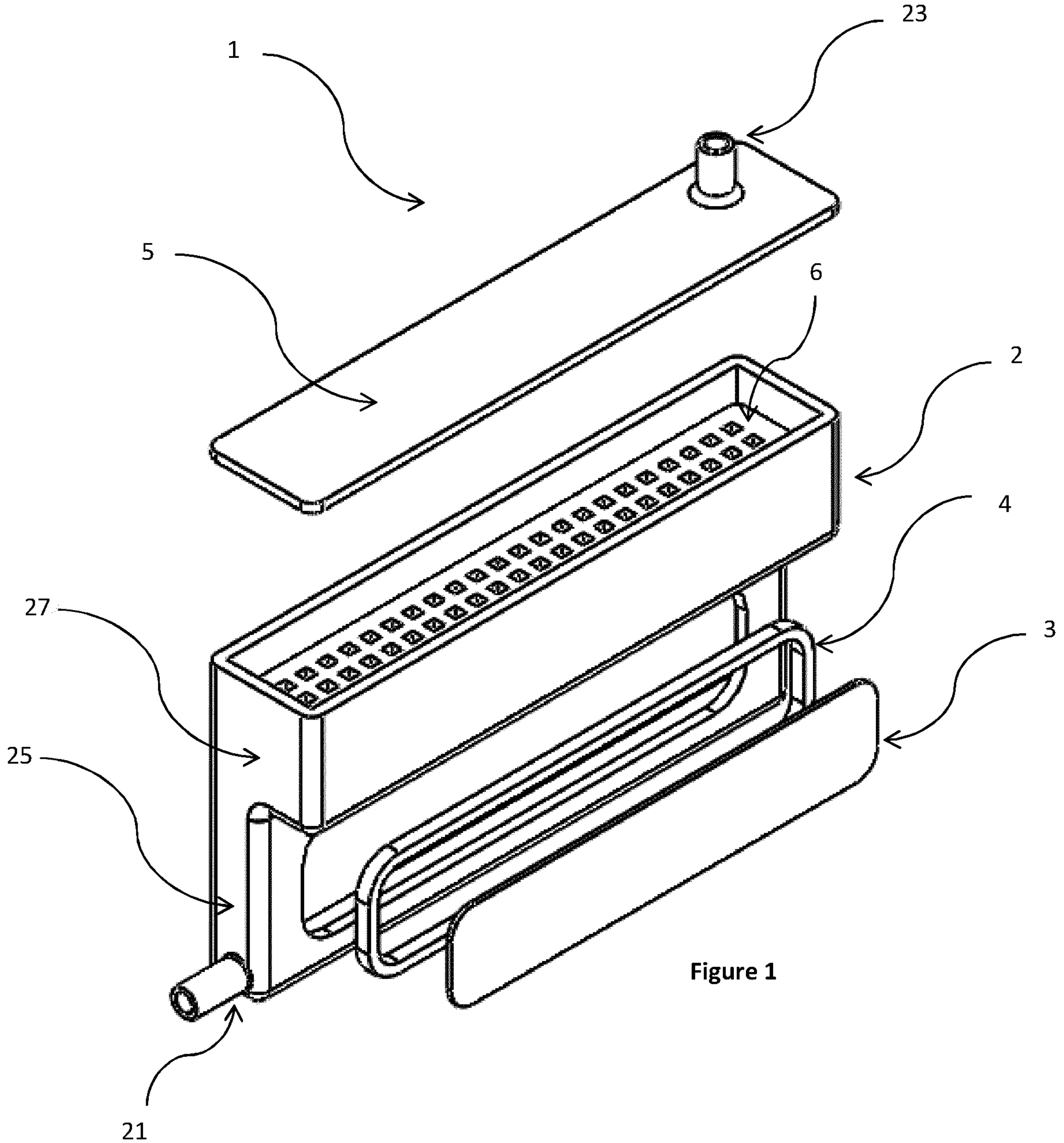
FIG. 1 shows a perspective exploded view of a steam generator according to an embodiment of the present invention.

In the following description, functionally similar parts carry the same reference numerals between figures. Embodiments of the invention are now described, by way of example only, with reference to the accompanying drawings. In this description 'upper', 'lower', 'top', bottom' and similar terms are defined with reference to the normal orientation of the steam generator 1 when it is in use, for instance with the steam output 23 located toward the top of the steam generator 1 to allow steam to escape through it.

Embodiments of the invention comprise a steam generator 1 with an electrical heating element 3 mounted in an upright orientation with respect to the orientation of the steam generator 1 in use, where upright includes vertical and substantially vertical orientations. The steam generator 1 may be a modular unit within a larger appliance, or may be a standalone steam generator 1.

The steam generators 1 of embodiments of the present invention include a heating chamber 2. The heating chamber 2 may comprise a lower portion 25 and an upper portion 27. The lower portion 25 may include the heating element 3 and is configured to hold a volume of water to be heated by the heating element 3. The heating chamber 2 includes a water inlet 21 for introducing water to the steam generator 1. The water inlet 21 may be located in either the upper portion 27 or the lower portion 25. The water inlet 21 may receive water by a pump, or under gravity from a reservoir or from a separate source which may be operated or provided by the user. The upper portion 27 is configured to receive the steam generated by the heating of the water in the lower portion 25, and accordingly the upper portion 27 includes a steam outlet 23 allowing it to leave the steam generator 1. Preferably the steam outlet 23 is in a lid 5 which forms the upper surface of the steam generator 1 when in use. Preferably the steam outlet 23 is orientated in a direction substantially parallel to the plane of the heating element 3. The steam outlet 23 may be connected to an inlet of a larger appliance.

A side wall of the heating chamber 2 comprises the heating element 3, such that the side wall either includes the heating element 3 or consists of the heating element 3. Preferably, the side wall of the lower portion 25 comprises the heating element 3, such that the side wall either includes the heating element 3 or consists of the heating element 3. The heating element 3 may be a conventional heating element. Preferably, the heating element 3 may be planar. The heating element may be of the brazed type with an aluminium sheathed element brazed to an aluminium diffuser plate, where the diffuser plate may be brazed to a stainless steel plate which forms an inside wall of the lower portion 25 of the heating chamber 3. Alternatively the heating element can be of the thick film variety. For instance, the heating element 3 may be a thick film heating element, for instance as described in the present Applicant's prior application GB 2466219 A. If a thick film heating element is used, this may optionally include a plurality of heating tracks. The heating element 3 may be sealed to the heating chamber 2 by a sealing member 4. The lower portion 25 is designed to hold water to be heated to generate steam.

In use, water is introduced into the steam generator 1 through the water inlet 21 such that it at least partially fills the lower portion 25. At the filling stage, the volume of water introduced into the lower portion 25 of the steam generator 1 should not exceed the volume of the lower portion 25. In other words, the steam generator 1 should not be filled with a volume of water that extends into the upper portion 27. Once the lower portion 25 is filled, the heating element 3 will then be supplied with electrical power such that it heats the water in the lower portion 25 until the temperature of the water is sufficient to produce steam. At this point, the electrical power to the heating element 3 may be maintained, reduced or may be switched off dependent on the particular appliance and application. The steam emitted in the lower portion 25 will rise and enter the upper portion 27, to leave the steam generator 1 through the steam outlet 23. Further specific embodiments will be described in more detail below.

An embodiment of the present invention is described with reference to FIG. 1, which shows heating element 3 orientated in a substantially vertical or upright position with respect to the orientation of the steam generator 1 in use. Advantageously, this arrangement allows for a significant saving of space when compared to conventional steam generators, which for instance as described above include underfloor heating elements located in the base of the appliance. In particular, the heating element 3 being substantially vertical or upright allows a substantial reduction in the footprint of the steam generator 1, without reducing the surface area of the water in contact with the heating element 3, and therefore allowing the thin profile as shown in FIG. 1.

In particular, the substantially vertical or upright heating element 3 configuration allows for the lower portion 25 to have a considerably reduced width as compared with conventional horizontally mounted heating element appliances. Further, the relatively narrower lower portion 25 can provide a smaller volume for holding water, and therefore advantageously provides for a reduced time for the heating element 3 to heat the water to a temperature at which steam is produced. This is particularly advantageous in applications where only a small amount of steam is required, and therefore only a small volume of water need be stored.

This advantageously thin profile and footprint of the steam generator 1, as provided by mounting the heating element 3 in the substantially vertical or upright orientation of embodiments of the present invention, results in a relatively small upper surface area of any water located in the heating chamber 2. In particular, the upper surface area of any water in the heating chamber 2 will be small compared to the upper surface area of water in any conventional horizontally mounted heating element appliances. The upper surface area of water in the heating chamber 2 defines the surface area from which steam is emitted when the steam generator 1 is in use. The smaller upper surface area of water in the heating chamber 2 may increase the likelihood of water droplets issued from the heated water being forced up and escaping out of the steam outlet 23. In part, this is because the steam outlet 23 now occupies a relatively larger proportional area when compared to the upper surface of the water in lower portion 25 of the heating chamber 2.

Advantageously, embodiments of the present invention overcome this problem by providing that the upper portion 27 of the heating chamber 2 may be wider than the lower portion 25. In use only the lower portion 25 is configured to hold water to be heated. Hence, the provision of the upper portion 27 advantageously allows a space that provides a sufficient distance between the upper surface of the water and the steam outlet 23 such that the problem of unwanted water droplets leaving the steam outlet 23 is reduced and/or entirely eliminated.

Further still, the upper portion 27 may be provided with a baffle 6 such that in use the baffle 6 is located between the upper surface of the water and the steam outlet 23, thus providing a physical barrier or filter which prevents water droplets escaping with the steam through the outlet 23. The baffle 6 may include perforations of a suitable size to prevent water droplets passing though, but to allow steam to pass through. The baffle 6 may include a mesh, or alternatively or in addition to the baffle 6, a mesh may be added such that in use it is located between the upper water surface and the steam outlet 23. This mesh may be a planar mesh made from a suitable metal such as stainless steel or from plastic, or may be a three dimensional mesh of similar materials. Whilst this is described and shown only in relation to FIG. 1, the baffle 6 and the additions and alternatives as described in this paragraph may be applied to any of the embodiments of the present invention as described below.

For applications which require a larger volume of steam, and which are not supplied by a pump mechanism, it is conventional in prior art systems to have all the water to be heated being introduced initially into the heating chamber for simultaneous bulk heating, with no further introduction of water until the steam generator is switched off, cooled down, and/or has entirely run out of water. The introduction of such a large volume of water to be simultaneously heated disadvantageously causes a considerable increase in the time taken for the heating element to heat the water to the point of steam generation.

Embodiments of the present invention advantageously overcome this disadvantage by simultaneously providing fast generation of steam and large steam generating capacity, in other words without compromising on the amount of steam able to be generated before the steam generator 1 needs refilling. In particular, embodiments of the present invention allow for a reduced volume of water to be stored in the heating chamber 2, therefore allowing a reduced time to steam generation, but allow for further water to be supplied either continuously, incrementally or on demand to the heating chamber 2. For instance, water may be introduced into the heating chamber 2 through the water inlet 21 either from a remote reservoir or external water source, and may be introduced either under pressure from a pump or passively under gravity.

According to the embodiment as described with reference to FIGS. 2 and 2A, the provision of the heating element 3 in the side wall of the steam generator 1 advantageously allows for the inclusion of an insulating wall or baffle 19, preferably parallel to the wall comprising the heating element 3. For ease of reference, the heating element 3 is not shown in FIG. 2A. The baffle 19 separates the lower portion 25 into a first area 29 in direct contact with the wall of the heating chamber 2 comprising the heating element 3, and a second area 31 not in direct contact the heating element 3. The baffle 19 may include a hole or a plurality of holes 33 at its base to allow the passage of water between the first and second areas 29, 31. The dimensions of the hole or holes 33 are such that in use the rate of transfer of heat through the water from the first area 29 to the second area 31 is lower than the rate of transfer of heat from the heating element 3 into the water in the first area 29 of the lower portion 25. Accordingly, the water in the first area 29 of the lower portion 25 heats faster than the water in the second area 31, and the water in the first area 29 is heated sufficiently to generate steam.

Beneficially, this configuration maintains and stores an increased volume of water in the lower portion 25 as a whole, whilst also advantageously reducing the time for the water in the lower portion 25 to be brought to a temperature that generates steam when compared to horizontal or underfloor heating configurations as known in the art. For instance, if the baffle 19 is located in the middle of the lower portion 25 as shown in FIG. 2A, the volume of water the heating element 3 has to heat to initially generate steam is effectively halved compared to the amount of water the lower portion 25 is actually holding in total. In particular, as the water in the first area 29 adjacent to and in contact with the heating element 3 is heated and steam is generated, the level of the water in the first area 29 is effectively continuously topped up by the water in the second area 31 as it flows from the second area 31 into the first area 29 through the hole or holes 33. This advantageously effectively compensates for the water lost as steam from the first area 29, but does so continuously throughout the steam generation process such that at any time the amount of cooler water entering the first area 29 from the second area 31 is small enough to be heated sufficiently without affecting the rate of emission of steam from the upper surface of the water in the first area 29.

Alternatively, the baffle 19 may be located between the side walls of the lower portion 25 at a location other than in the middle of the side walls. For instance the baffle may be located a third of the distance between the side wall comprising the heating element and the opposite side wall, such that the width of the second area 31 is twice that of the first area 29. Advantageously, such a configuration would even further reduce the time for the water in the first area 29 to generate steam. Locating the baffle 19 at other distances between the side walls is also envisaged.

The total width of the lower portion 25 as shown in FIGS. 2 and 2A may be larger than in other embodiments of the present invention, such that the total volume of water held in the lower portion 25 may be increased. In particular, such a configuration allows for the total volume of water available to the steam generator 1 to be the same as that described in the embodiments of FIGS. 3 and 4 as described below. The embodiment of FIG. 2 may also include a filling cap 9 located in the lid 5 of the steam generator 1, which is configured to be opened and closed manually by the user to allow water to be introduced to the heating chamber 2. Although only described in relation to FIGS. 2 and 2A, the baffle 19 arrangement may be applied to, included in and combined with any of the other embodiments of the present invention.

Figure 3:
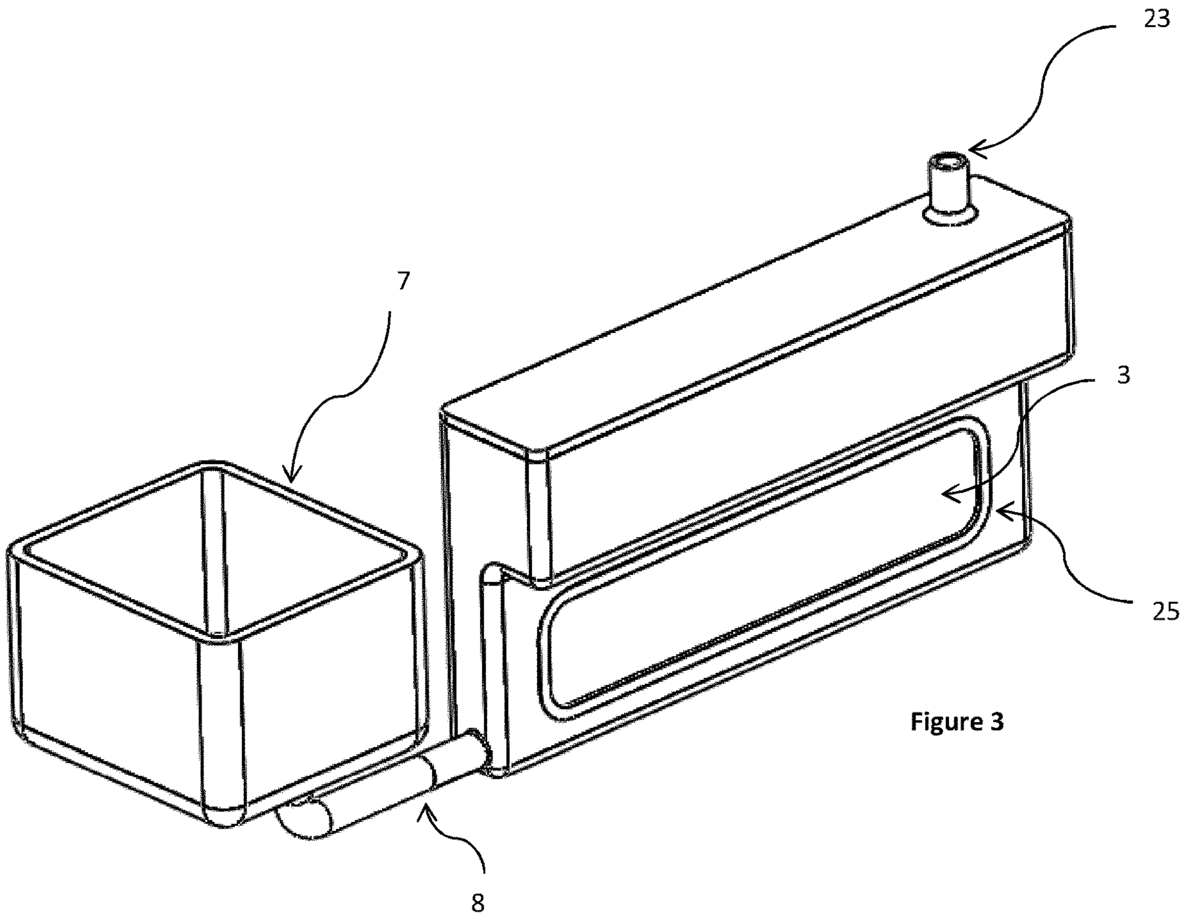
FIG. 3 shows a perspective view of a steam generator according to an embodiment of the present invention.

A further embodiment of the present invention which develops the advantageous separation concept of the previous embodiment is described with reference to FIG. 3, which provides a separate reservoir 7. In comparison with the steam generator 1 of FIG. 2, the lower portion 25 is relatively narrow in the present embodiment as the reservoir 7 allows a volume of water to be stored outside the lower portion 25. Hence, whilst the total volume of water stored in the embodiments of FIGS. 2 and 3 may be equal, FIG. 3 advantageously provides for some of the water to be stored outside the lower portion 25.

In this embodiment, the reservoir 7 is connected to the bottom of the lower portion 25 by a pipe 8. The connection between the lower portion 25 and the reservoir 7 through the pipe 8 may be considered analogous to the connection between the first area 29 of the lower portion 25 and the second area 31 of the lower portion 25 through the hole or holes 33 of the baffle 19 as described above in relation to FIG. 2. Accordingly the operating principle and the advantages as described there apply equally here. The reservoir 7 is not air tight, such that as steam is generated in the lower portion 25 water is able to flow freely and continuously from the reservoir 7 to the lower portion 25 to compensate for the loss of water as steam. Hence in this embodiment the height of the reservoir 7 needs to be largely the same as that of the lower portion 25 of the steam generator, such that the water can freely flow under gravity from the reservoir 7 to provide the compensation as described above. Advantageously, this configuration also allows for the lower portion 25 to automatically replenish its water supply without active intervention by the user, and to thereby provide for an increased speed of steam generation without reducing the overall volume of water able to be converted to steam by the steam generator 1 in a single use.

Optionally, the reservoir 7 and pipe 8 may be detachable from the heating chamber 2 and may include a valve configured to close and prevent water leakage when the reservoir 7 is disconnected from the heating chamber 2, and to open when the reservoir 7 is connected to the heating chamber 2. Further, if the baffle 19 as described in relation to FIGS. 2 and 2A is used with this embodiment, the pipe 8 may be configured to feed the water into the second area 31.

Another embodiment of the present invention which yet further develops the advantageous separation concept as described in the previous two embodiments is described with reference to FIGS. 4, 4A and 4B, which also provides a separate reservoir 12. In this embodiment the reservoir 12 is located at a height above the lower portion 25, and is connected to the top of the lower portion 25 by a pipe 13 and optionally a valve 14. The reservoir 12 may further include a filling cap 9 configured to be opened and closed to allow water to be introduced to the reservoir 12. FIG. 4B is a closer view of the section A detail of FIG. 4A and shows the connection between the pipe 13 and the valve 14.

The reservoir 12 is provided in an airtight configuration. Advantageously, the reservoir 12 thereby automatically fills the lower portion 25 of the heating chamber 2 until the level of the water reaches the bottom of the valve 14. In particular, the airtight nature of the reservoir 12 facilitates this as when the level of the water in the lower portion 25 reaches the bottom of the valve 14, air is unable to pass through the pipe 13 and into the reservoir 12, and as such no water flows. When the level of water falls below the bottom of the valve 14, air is allowed to enter the reservoir 12 and water accordingly flows into the lower portion 25 until the water level once again reaches the bottom of the valve 14. If no valve 14 is fitted to the reservoir the water level will level is controlled by the level of the bottom of pipe 13. In this way, the level of water in the lower portion 25 of the heating chamber is maintained automatically during the steam generation process without user intervention. Hence the configuration similarly provides for a reduced time for the steam generator 1 to generate steam, whilst advantageously also providing for a high volume of water and therefore steam to be provided by the steam generator 1 as a whole, similarly as to the advantages as described above in relation to the embodiments of FIGS. 2 and 3.

Optionally, and as shown in the, FIGS. 4, 4A and 4B, the reservoir 12 may be removable from the steam generator 1 for filling as facilitated by the valve arrangement 14. In particular, where the pipe 13 is part of the reservoir 12, the pipe 13 is separable from the water inlet 16. The valve 14 may interact with a projection 15 located in the water inlet 16, where the projection 15 opens the valve 14 to allow water to flow from the reservoir 12 into the heating chamber 2 until the water lever level reaches the bottom of the valve 14.

Hence the valve 14 and projection 15 prevent water from leaking out of the pipe 13 when pipe 13 is not connected to the water inlet 16, in other words when the reservoir 12 is not connected to the heating chamber 2. This advantageously allows the user to quickly and easily refill the reservoir 12 with water, and allows simple fitting of the reservoir 12 to the heating chamber. If the baffle 19 as described in relation to FIGS. 2 and 2A is used with this embodiment, the pipe 13 and water inlet 16 would be configured to feed the water into the second area 31.

The different heights of the reservoirs 7 and 12 as described with reference to FIGS. 3, 4, 4A and 4B advantageously provide a diverse range of possible locations for the reservoirs 7 or 12 such that the size of the overall steam generator 1 and/or appliance can be minimized depending on the different appliance or application the steam generator 1 may be used in.

Another embodiment of the present invention is described with reference to FIG. 5. The upright or vertical orientation of the heating element 3 as described in embodiments of the present invention further provides for an advantageous ability to limit the impact of deposits such as limescale on the effective operation and working lifetime of the steam generator 1. In particular, in conventional underfloor or horizontal heating element arrangements, deposits fall under gravity and cover the surface of the heating element located towards the bottom or in the base of the steam generator. This build up disadvantageously affects the operation of the appliance by insulating the water from the heating element and thereby reducing the heat transfer between the two, leading to increased time to steam generation. This disadvantageously causes increased wear on the heating element and causes the heating element to effectively have to locally overheat to compensate for the heat being lost into the deposit buildup.

In embodiments of the present invention the substantially vertical or upright arrangement of the heating element 3 allows the deposits to fall under gravity to the bottom of the lower portion 25 of the heating chamber 2, where deposit buildup in this location is remote from at least the majority of the heating element 3 located in at least part of the height of the side wall of the heating chamber 2. Hence the effective operation of the heating element 3 is maintained to a considerably higher degree than in prior art configurations, and the desirable fast generation of steam as provided for by embodiments of the present invention is maintained.

Preferably, the sidewall of the lower portion 25 of the heating chamber 2 is provided with an outlet 17 including a removable outlet cover 18, which advantageously allows the user to gain access to the base of the lower portion 25 of the heating chamber 2 and thereby remove the buildup of deposits therein. This advantageously considerably increases the effective operation of the heating element 3 and increases the operating lifetime of the steam generator 1 as a whole. Further, descaling solutions such as weak acidic solutions, e.g. citric acid, could be used in the device and then advantageously emptied from the device using the outlet 17.

In a specific embodiment the present embodiment, the heating element 3 is mounted within a side wall of the lower portion 25 of the heating chamber 2 such that there is a small separation between the bottom of the heating element 3 and the very bottom of the lower portion 25 of the heating chamber 2. In this variant, the outlet 17 would be located entirely below the heating element 3. This is shown in FIG. 5. In this specific embodiment, the buildup of deposit on the bottom of the lower portion 25 would advantageously not impact the effective operation of the heating element 3 as the buildup would not contact the heating element 3, and instead would collect below the heating element 3. Such a configuration further provides the advantages of the present embodiment as described above.

Whilst these features and advantages are described and shown in relation to FIG. 5, the features such as the outlet 17 and outlet cover 18 described here may be applied to any of the embodiments of the present invention as described herein.

The substantially upright or vertical configuration of the heating element 3 in embodiments of present invention also advantageously facilitates an improved water level sensor and thermal cut-out configuration over the state of the art. In particular, as described above, in horizontal or underfloor heating element configurations as in the prior art, the thermal cut-out only operates when the entire heating element is overheating due to the near total absence of water covering any aspect of the heating element. This is because in a horizontal or underfloor heating element arrangement, the entire heating element 3 has the same level of water covering it at any one time.

However, embodiments of the present invention may include an advantageous thermal cut-out circuitry configured to measure the temperature of the heating element 3 at a location above the bottom of the heating element 3. Advantageously, the thermal cut-out can therefore also be configured to measure the point at which the water level is approaching a predetermined minimum level, without allowing undue overheating of the heating element 3. The thermal cut-out sensor may be configured to detect at least a first temperature which indicates that the water level has passed below a predetermined level, and may be configured to detect a second temperature higher than the first temperature which indicates that there is very little or no water remaining and that the heating element 3 should therefore be switched off to avoid overheating. The output of the thermal cut-out sensor may provide an indication to a user, such as by illumination of a light and/or output of an audible sound.

Further still, prior art steam generators which are filled by a pump often use a first sensor in the heating chamber to measure the point at which the water level reaches a predetermined minimum desired level, and a second sensor in the heating chamber to measure the point at which the water level reaches a predetermined maximum level. In this way, when the first sensor detects the minimum desired water level, a signal is sent to the pump to introduce water into the heating chamber. When the second sensor detects that the maximum desired water level is reached a further signal is sent to pump to stop it introducing water into the heating chamber. The second sensor detecting the maximum desired water level can be omitted if the maximum flow rate from the pump is known and the pump is operated for a time calculated to increase the water level to close to the maximum level.

In embodiments of the present invention, for instance when the steam generator 1 is filled with water by a pump through the water inlet 21, it is advantageously possible to use the thermal cut-out circuitry as described above to also simultaneously provide the detection of a predetermined minimum water level, and thereby simplify the steam generator 1 by removing the need for the dedicated first level sensor measuring the point at which the water level reaches a predetermined minimum desired level. Further, the second dedicated level sensor can also be removed by adopting the method of controlling the time the pump is operated for based on a known water flow rate, as described above. This advantageous simplification is possible because the use of the thermal cut-out sensor with the substantially vertical or upright heating element 3 of embodiments of the present invention allows the thermal cut-out sensor to take advantage of the gradual change of temperature along the height of the heating element 3 as the water level falls due to steam generation.

In particular, in embodiments of the present invention, the thermal cut-out sensor can be configured to measure the temperature at a particular location or section on the heating element 3. For instance, the thermal sensor may be configured to measure the temperature at a height midway up the heating element 3. Alternatively, the thermal cut-out sensor can be configured to measure the temperature of the heating element near the top of the heating element 3, or may be configured to measure the temperature at a location between these two positions. The thermal cut-out sensor may be configured to measure the temperature at a height in the lower half of the heating element 3, but should not be configured to measure the temperature at the very bottom of the heating element 3.

In such configurations, the thermal cut-out sensor will measure when a specific local area of the heating element 3 increases in heat above the first predetermined temperature, and can therefore be used to send a signal to a remote pump to begin refilling the heating chamber 2 with water at this point. In contrast to the horizontal or underfloor heating elements of the prior art, as the water level reduces in embodiments of the present invention, the heating element 3 is gradually exposed from top to bottom. Hence the temperature of the heating element 3 gradually increases from top to bottom as the water level moves down the heating element 3 due to steam generation. In contrast, in the horizontal or underfloor heating elements of the prior art the entire heating element will always be at the same temperature having substantially the same depth of water across its entire surface, and will pass from an acceptable temperature to overheating in a near binary fashion as the final surface layer of water is evaporated from the heating element.

In embodiments of the present invention a local increase in temperature of the heating element 3 at a point midway or above on the heating element 3 would not occur at a time when the entire heating element 3 is overheating, as the remaining area of the heating element 3 below the chosen location of the thermal cut-out sensor would still be in contact with water. Hence the embodiments of present invention advantageously allows the thermal cut-out sensor to be used to additionally measure a water level without damaging the heating element 3 in the process. This therefore advantageously removes the need for a dedicated water level sensor, and simplifies the overall configuration of the steam generator 1.

Optionally, if a thick film heating element is used as the heating element 3, the thermal cut-out may be provided by E-Fast sensing technology as described in the Applicant's prior application WO 2008/150172 A1 can be used.

ALTERNATIVE EMBODIMENTS

The embodiment described above is illustrative of, rather than limiting to, the present invention. Alternative embodiments apparent on reading the above description may nevertheless fall within the scope of the invention.

| References | |
|---|---|
| 1 | steam generator |
| 2 | heating chamber |
| 3 | heating element |
| 4 | sealing member |
| 5 | lid |
| 6 | baffle |
| 7 | reservoir |
| 8 | pipe |
| 9 | cap |
| 12 | reservoir |
| 13 | pipe |

-continued

| References | |
|---|---|
| 14 | valve |
| 15 | projection |
| 16 | water inlet |
| 17 | outlet |
| 18 | outlet cover |
| 19 | baffle |
| 21 | water inlet |
| 23 | steam outlet |
| 25 | upper portion |
| 27 | lower portion |
| 29 | first area |
| 31 | second area |
| 33 | hole or holes |

The invention claimed is:

1. A steam generator, comprising:

a heating chamber for heating water to generate steam, the heating chamber comprising a lower portion for holding and heating water to generate steam, and an upper portion for receiving steam generated in the lower portion, wherein a planar thick film heating element is mounted within a sidewall of the lower portion of the heating chamber such that the heating element is in contact with water within the lower portion of the heating chamber.

2. The steam generator of claim 1, wherein the upper portion is wider than the lower portion in a plane perpendicular to the heating element.

3. The steam generator of claim 1, further comprising a baffle in the upper portion configured to prevent the passage of water but allow the passage of steam.

4. The steam generator of claim 1, further comprising an upright separating wall configured to divide the lower portion into a first area adjacent to the heating element and a second area remote from the heating element, wherein the separating wall comprises at least one passage at the bottom of the lower portion for allowing water to flow between the first and second areas.

5. The steam generator of claim 4, wherein the separating wall is between the heating element and a second wall of the heating chamber opposite the heating element.

6. The steam generator of claim 4, wherein the material of the separating wall and the size of the at least one passage are configured such that in use the water in the second area is heat insulated from the heating of the water in the first area during steam generation in the first area.

7. The steam generator of claim 4, wherein the separating wall is parallel to the heating element.

8. The steam generator of claim 1, further comprising a reservoir configured to automatically supply water to the bottom of the lower portion via an inlet.

9. The steam generator of claim 8, wherein the reservoir is removable from the heating chamber and further comprising a valve configured to open when the reservoir and heating chamber are connected and close when the reservoir and heating chamber are disconnected.

10. The steam generator of claim 1, further comprising an airtight reservoir configured to automatically supply water to the lower portion via an inlet when the level of water in the lower portion is below the top of the lower portion.

11. The steam generator of claim 10, wherein the airtight reservoir is configured to automatically supply water to the lower portion until the level of water reaches the bottom of a pipe supplying water from the reservoir.

12. The steam generator of claim 1, further comprising an outlet at the bottom of the lower portion for allowing the removal of contents of the heating chamber from the lower portion.

13. The steam generator of claim 1, further comprising an inlet for allowing water to enter the heating chamber from a pumping mechanism.

14. The steam generator of claim 1, further comprising a thermal sensor configured to detect whether the temperature of the heating element is greater than a predetermined temperature.

15. The steam generator of claim 14, wherein the thermal sensor is configured to detect whether the temperature of a section of the heating element is greater than the predetermined temperature, and wherein the section is a top section of the heating element.

16. The steam generator of claim 15, wherein the thermal sensor is configured to detect:

a first predetermined temperature indicative of the level of water being below a predetermined height of the lower portion; and a second predetermined temperature higher than the first temperature and indicative of the level of water being below a predetermined minimum height of the lower portion.

17. The steam generator of claim 16, further comprising an inlet for allowing water to enter the heating chamber from a pumping mechanism, wherein when the first predetermined temperature is detected, a signal is sent to the pumping mechanism to supply the heating chamber with water.

18. An appliance comprising the steam generator of claim 1.

19. The steam generator of claim 1, wherein the planar thick film heating element is sealed into the sidewall of the heating chamber.

20. The steam generator of claim 1, wherein the heating element includes a plate which forms at least part of the sidewall of the lower portion of the heating chamber.

21. The steam generator of claim 20, wherein the plate is of stainless steel.

* * * * *